United States Patent
Walch

(10) Patent No.: US 7,672,487 B2
(45) Date of Patent: *Mar. 2, 2010

(54) DIGITAL ENCODING OF IMAGES OF SKIN-COVERED BODY PARTS

(75) Inventor: Roland Walch, 1721 Adoncour, Longueuil, Quebec (CA) J4J 5L4

(73) Assignee: Roland Walch, Longueuil, Quebec (CA)

( * ) Notice: Subject to any disclaimer, the term of this patent is extended or adjusted under 35 U.S.C. 154(b) by 0 days.

This patent is subject to a terminal disclaimer.

(21) Appl. No.: 10/561,910

(22) PCT Filed: Sep. 13, 2005

(86) PCT No.: PCT/CA2005/001409

§ 371 (c)(1),
(2), (4) Date: May 23, 2007

(87) PCT Pub. No.: WO2007/030907

PCT Pub. Date: Mar. 22, 2007

(65) Prior Publication Data

US 2008/0226141 A1    Sep. 18, 2008

(51) Int. Cl.
*G06K 9/00* (2006.01)
(52) U.S. Cl. .................. 382/115; 382/124; 340/5.53
(58) Field of Classification Search ............ 382/125, 382/115, 124, 190, 181, 288, 286, 204, 203; 340/5.52, 5.53, 5.82, 5.83; 345/157; 356/71

See application file for complete search history.

(56) References Cited

U.S. PATENT DOCUMENTS

| 6,195,447 | B1 | 2/2001 | Ross |
| 6,532,301 | B1 | 3/2003 | Krumm et al. |
| 6,819,219 | B1 | 11/2004 | Bolle et al. |
| 2004/0036574 | A1 | 2/2004 | Bostrom |

(Continued)

FOREIGN PATENT DOCUMENTS

JP    2002207705 A2    7/2002

(Continued)

OTHER PUBLICATIONS

Myers, Deborah J., "Take your order? Check probation? Kiosk use grows", Boulder County Business Report, Jan. 11, 2002, 1 page.

(Continued)

*Primary Examiner*—Sheela C Chawan

(57) ABSTRACT

Methods and apparatus for obtaining a digital code representative of a skin-covered body part (fingertip or other). An image of the body part is acquired, where the image includes a plurality of pixels, each pixel having an associated shade value. A plurality of subsets of pixels from the plurality of pixels is identified, with each subset including at least two pixels having a common one of a plurality of designated shade values. For each of a plurality of combinations of pixels taken from the pixels in the subsets of pixels, a geometric measure of the pixels in that combination is determined and then the geometric measures are encoded into a digital code for the skin-covered body part. In this way, a unique code is obtained that does not contain information about the structure of the body part, thereby alleviating privacy concerns in applications such as access control and offender supervision.

40 Claims, 14 Drawing Sheets

U.S. PATENT DOCUMENTS

2007/0147665 A1* 6/2007 Walch .................. 382/124
2008/0101661 A1* 5/2008 Walch .................. 382/124

FOREIGN PATENT DOCUMENTS

WO  WO 98/58346  12/1998

OTHER PUBLICATIONS

Faundez-Zanuy, M., "Privacy issues on biometric systems", Aerospace and Electronic Systems Magazine, IEEE, Feb. 2005, vol. 20, Issue 2, 1 page.

Pietrucha, Bill, "New York City Installs Electronic Probation System", Newsbytes News Network, Mar. 3, 1997, 3 pages.

No Author, "Parole board selects verification system by The Biometric Solutions Group", Access Control & Security Systems Integration, Oct. 1, 2001, 2 pages.

Anderson, Dustee, "Help for probation officers checks in.; CheckIn electronic reporting system . . . ", Network World, Apr. 14, 1997, 2 pages.

No Author, "New York City awards $925,000 contract to Pacer Infotec for electronic probabtion management system", Business Wire, Mar. 5, 1997, 2 pages.

SafePass Access Controller, downloaded on Aug. 22, 2005 from http://www.schoolleader.com/Products_SafePass.htm, 2 pages.

Chang, Peng et al., "Object Recognition with Color Cooccurrence Histograms", Copyright 1999 IEEE, 7 pages.

Emeran, Riyad, "Biometric IBM ThinkPad T42—Exclusive Preview", Copyright 2003-2007 TrustedReviews.com Ltd., Oct. 4, 2004, 8 pages.

Crowe, Ann H. et al., "Offender Supervision with Electronic Technology", Copyright 2002 American Probation and Parole Association, 137 pages.

* cited by examiner

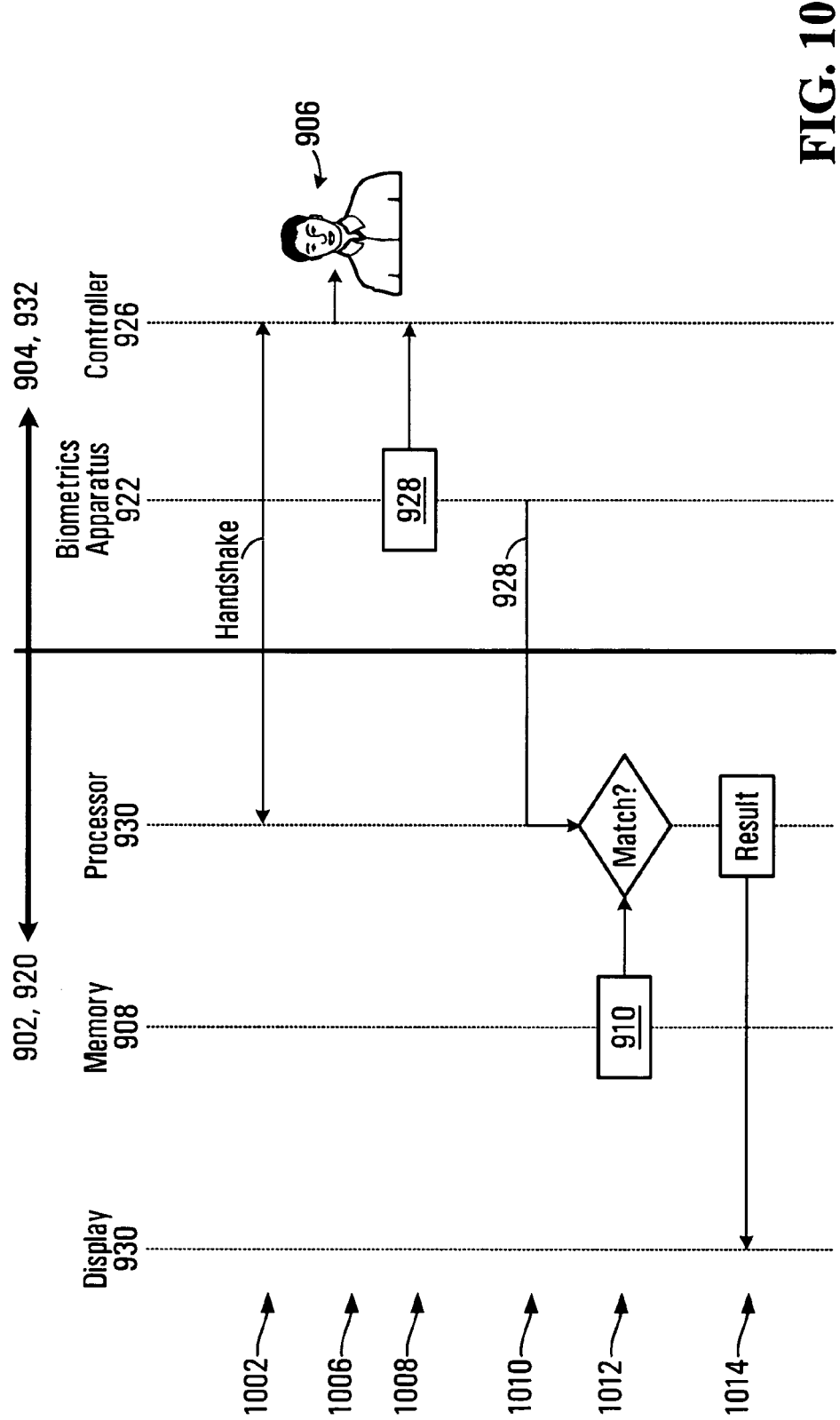

DIGITAL ENCODING OF IMAGES OF SKIN-COVERED BODY PARTS

FIELD OF THE INVENTION

The present invention relates generally to biometrics and, more particularly, to digital encoding of images of skin-covered body parts for use in a variety of applications.

BACKGROUND

Biometric recognition refers to the use of distinctive physiological (e.g., fingerprints, face, retina, iris) and behavioral (e.g., gait, signature) characteristics, called biometric identifiers (or simply biometrics) for automatically recognizing individuals. Because biometric identifiers cannot be easily misplaced, forged, or shared, they are considered more reliable for person recognition than traditional token- or knowledge-based methods. Specific applications where biometric identification is particularly useful include authentication and access control.

In the specific case of fingerprint recognition used for authentication of a person of interest, a management entity has knowledge of a target fingerprint image associated with the person of interest. When an individual who purports to be the person of interest provides a donor finger for scanning, the management entity compares the image of the donor finger with the target fingerprint image. In conventional automated fingerprint recognition, a search is done for matching features, or minutiae, in the two images. Examples of minutiae include core, delta, hook, ridge, bifurcation, island, lake, whorl, etc. For more information regarding fingerprint recognition in general, the reader is referred to D. Maltoni et al., "Handbook of Fingerprint Recognition", Springer-Verlag, 2003, hereby incorporated by reference herein.

To accelerate both the transfer of the image of the donor finger to the management entity as well as the comparison process itself, the image may be encoded into a string of characters. Specifically, a feature extraction process is performed, whereby the minutiae are first located in the image and then the locations of the minutiae and their type (ridge, island, etc.) are placed into an alphanumeric code. A similar code will have been previously generated by the management entity on the basis of the target fingerprint image. Thus, the authentication process consists of comparing the received code with the code stored at the management entity. A similar process occurs for access control to a facility, only the number of codes stored at the management entity may be far greater, since the identity of the purported donor is unknown a priori.

While the aforementioned technique can work well in theory, there are practical considerations which compound and possibly even overshadow the technical difficulties associated with being able to accurately locate minutiae in a fingerprint image. Specifically, upon recognizing that the code produced from a fingerprint image encodes certain salient structural features (i.e., the minutiae), a malicious user having access solely to the alphanumeric code may be capable of partly reproducing the fingerprint image. This may violate certain privacy statutes relating to the communication or storage of an individual's personal information. Moreover, the problem does not dissipate by merely encrypting the code, since a sufficiently malicious user may be able to learn the necessary decryption method and hence gain knowledge of the minutiae.

Clearly, therefore, a need exists in the industry for an improved technique to generate a code from an image of a skin-covered body part such as a finger, in such a way that reconstruction of minutiae or other salient structural features of the image will not be possible on the basis of the code alone.

SUMMARY OF THE INVENTION

According to a first broad aspect, the present invention seeks to provide a method of obtaining a digital code representative of a skin-covered body part. The method includes acquiring an image of the skin-covered body part, the image including a plurality of pixels, each pixel having an associated shade value in a range of shade values, followed by identifying a plurality of subsets of pixels from the plurality of pixels, each subset of pixels including at least two pixels having a common one of a plurality of designated shade values in the range of shade values. Then, for each of a plurality of combinations of pixels taken from the pixels in the subsets of pixels, the method includes determining a geometric measure of the pixels in said combination. Finally, the method includes encoding the geometric measures into a digital code for the skin-covered body part.

According to a second broad aspect, the present invention seeks to provide a computer-readable storage medium containing a program element for execution by a computing device to implement the above method of obtaining a digital code representative of a skin-covered body part, the program element including program code means for performing the various steps of the above method.

According to a third broad aspect, the present invention seeks to provide an apparatus operative to control a state of an access point. The apparatus includes a biometric module adapted to acquire an image of a skin-covered body part submitted thereto and a processing module adapted for producing, responsive to acquisition of an image by the biometric module, a candidate code based on geometric measures of respective combinations of pixels taken from a plurality of subsets of like-shaded pixels in the image. The processing module is further adapted for causing a comparison to be performed between the candidate code and a set of references codes and, responsive to receipt of a signal indicative of the comparison yielding a match between the candidate code and one of the reference codes, sending a release signal to a restraint mechanism to cause the restraint mechanism to release the access point.

According to a fourth broad aspect, the present invention seeks to provide a method of controlling a state of an access point. The method includes producing, responsive to acquisition of an image of a skin-covered body part submitted to a biometric module, a candidate code based on geometric measures of respective combinations of pixels taken from a plurality of subsets of like-shaded pixels in the image. The method further includes causing a comparison to be performed between the candidate code and a set of references codes and, responsive to receipt of a signal indicative of the comparison yielding a match between the candidate code and one of the reference codes, sending a release signal to a restraint mechanism to cause the restraint mechanism to release the access point.

According to a fifth broad aspect, the present invention seeks to provide an apparatus that includes a communication interface capable of communication with a management entity over a network; a biometric module adapted to acquire an image of a skin-covered body part submitted thereto; an output device; and a processing unit. The processing unit is adapted for releasing a prompting signal via the output device, the prompting signal prompting submission of a skin-covered body part at the biometric module. Furthermore, responsive to acquisition of an image by the biometric module further to releasing the prompting signal, the processing module is adapted for producing a candidate code based on geometric measures of respective combinations of pixels taken from a plurality of subsets of like-shaded pixels in the image. Finally, the processing module is adapted for releasing the candidate code via the communication interface for comparison at the management entity with an expected code, thereby to verify presence of a person associated with the expected code.

According to a sixth broad aspect, the present invention seeks to provide a method that includes releasing a prompting signal to prompt submission of a skin-covered body part at a biometric module. Furthermore, the method includes producing, responsive to acquisition of an image further to releasing the prompting signal, a candidate code based on geometric measures of respective combinations of pixels taken from a plurality of subsets of like-shaded pixels in the image. Finally, the method includes releasing the candidate code via the communication interface for comparison at the management entity with an expected code, thereby to verify presence of a person associated with the expected code.

These and other aspects and features of the present invention will now become apparent to those of ordinary skill in the art upon review of the following description of specific embodiments of the invention in conjunction with the accompanying drawings.

BRIEF DESCRIPTION OF THE DRAWINGS

In the accompanying drawings:

FIG. 10 is a flowchart showing steps in a supervision process executed at a management entity and a gathering process executed at a remote unit in the system of FIG. 9, in accordance with an embodiment of the present invention.

It is to be expressly understood that the description and drawings are only for the purpose of illustration of certain embodiments of the invention and are an aid for understanding. They are not intended to be a definition of the limits of the invention.

DETAILED DESCRIPTION OF EMBODIMENTS

Figure 1:
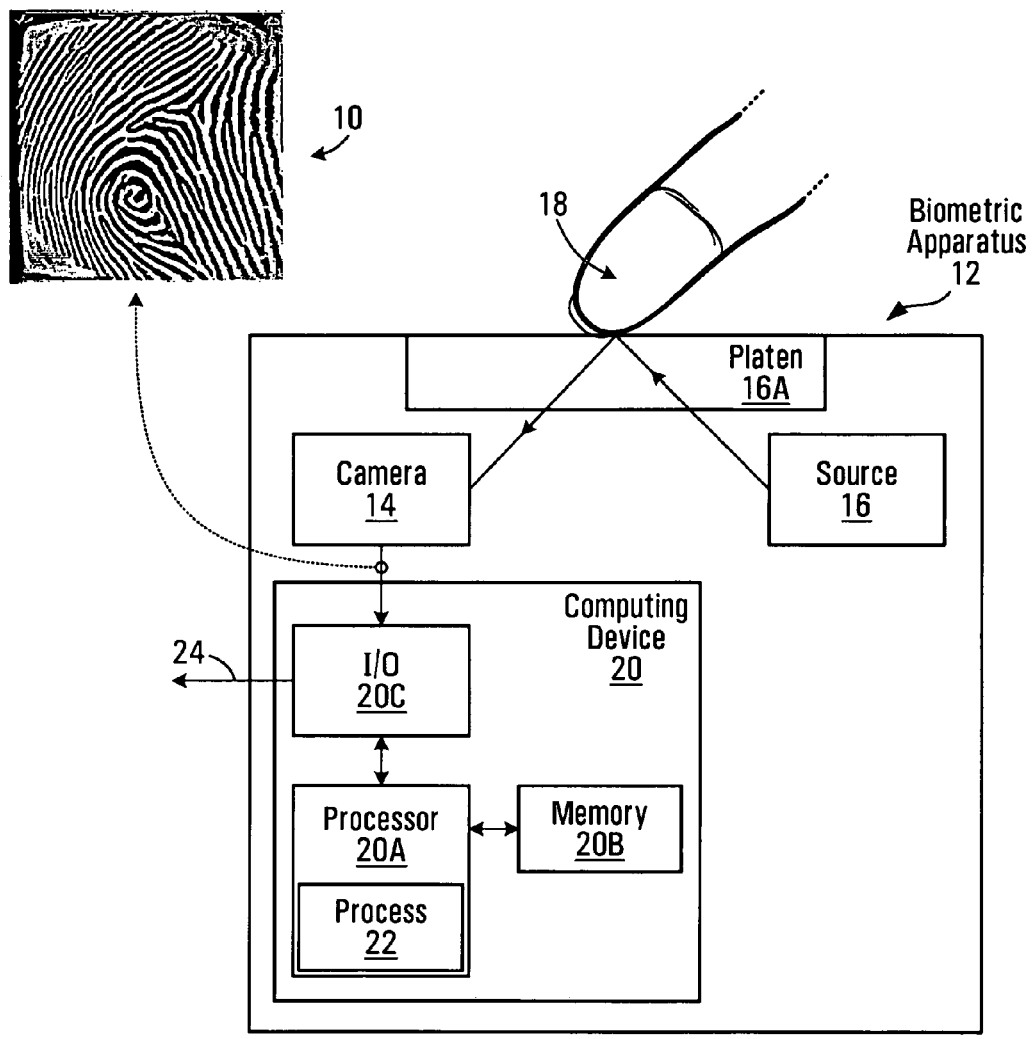
FIG. 1 is a block diagram of a biometric apparatus used for deriving a code from an acquired image of a skin-covered body part, in accordance with an embodiment of the present invention.

As shown in FIG. 1, there is provided a biometric apparatus 12 for deriving a code 24 from an acquired image of a skin-covered body part 18. In a specific non-limiting embodiment, the skin-covered body part 18 may be an individual's finger, whereas in other specific non-limiting embodiments, the skin-covered body part 18 may be an individual's ear, palm, forehead, nose, etc. Of course, the body part in its entirety is not required, and only a portion thereof may be used for the purposes of deriving the code 24.

The biometric apparatus 12 includes a camera 14 and a source 16. The source 16 emits light, which impinges on the skin-covered body part 18 pressed against a platen 16A. A certain amount of the light impinging on the skin-covered body part 18 will be reflected/refracted towards the camera 14. In a specific non-limiting embodiment, the camera 14 may be a digital camera (e.g., a CMOS charge-coupled device), which produces a digital image 10 of the skin-covered body part 18. The biometric apparatus 12 also includes a computing device 20 equipped with a processor 20A, a memory 20B and an input/output interface (I/O) 20C. The computing device 20 receives the digital image 10 from the camera 14 via the I/O 20C. The digital image 10 is processed by the processor 20A in accordance with a process 22 (described later on in greater detail) to derive the aforementioned code 24 representative of the skin-covered body part 18.

It should be understood that the present invention does not require the skin-covered body part 18 to be pressed against the platen 16A. Accordingly, the digital image 10 may be acquired by a traditional camera setup that captures, from a distance, the ambient light reflected off of the skin-covered body part 18. In this way, the present invention may be applicable to the processing of facial images. In other embodiments contemplated by the present invention, the digital image 10 may be acquired at a physically distinct location from the computing device 20 and transmitted thereto over a communication link and/or a network such as the Internet. In still other embodiments, the camera 14 may be a video camera that produces a video stream from which the digital image 10 can be derived.

The functionality of the processor 20A may be implemented as pre-programmed hardware or firmware elements (e.g., application specific integrated circuits (ASICs), electrically erasable programmable read-only memories (EEPROMs), etc.), or other related components. In other embodiments, the processor 20A may be implemented as an arithmetic and logic unit (ALU) or a neural processor having access to a code memory (not shown) which stores program instructions for the operation of the ALU. The program instructions could be stored on a medium which is fixed, tangible and readable directly by the processor 20A, (e.g., removable diskette, CD-ROM, ROM, fixed disk, USB drive), or the program instructions could be stored remotely but transmittable to the processor 20A via a modem or other interface device.

Figure 4:
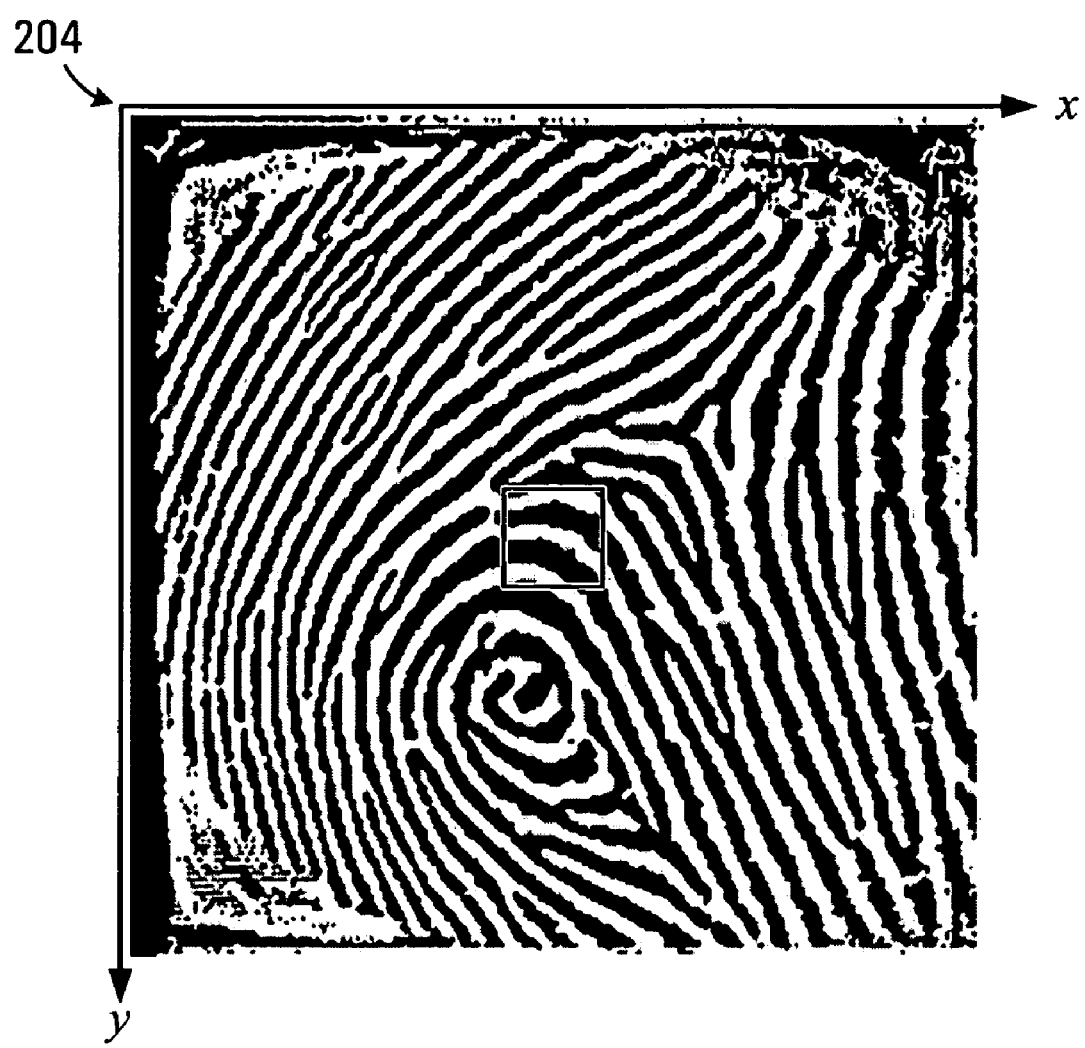
FIG. 4 shows a fingerprint image.
Figure 5:
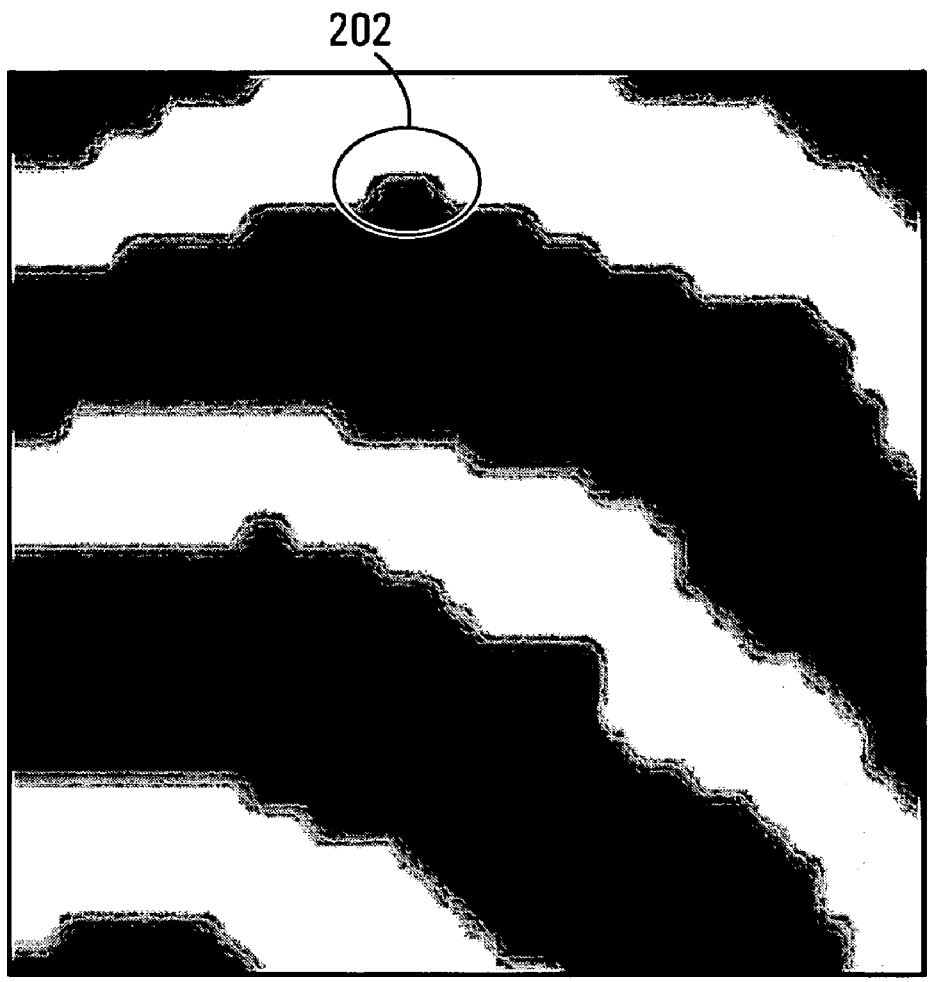
FIG. 5 shows a blown up portion of the fingerprint image of FIG. 4.

In accordance with a specific non-limiting embodiment of the present invention, and with additional reference to FIGS. 4 and 5, the digital image 10 is comprised of an array of pixels 202. Each pixel 202 occupies a position in the digital image 10 and is associated with a shade value. The position of a given pixel 202 in the digital image 10 can be defined by a point in a Cartesian plane with two orthogonal axes (denoted "X" and "Y") and an origin 204. The pixels 202 can thus be said to have "X" and "Y" coordinates. The number of pixels 202 in the array along each of the axes depends on operational requirements. For example, the number of pixels 202 along each axis may be the same or different.

In the illustrated non-limiting example embodiment, the digital image 10 includes an array of 256×256 pixels 202, while the origin 204 for the purposes of positioning the pixels 202 is at the top left-hand corner of the digital image 10. In this case, the pixels 202 will occupy coordinates ranging from (1,1) in the top left-hand corner (at the origin 204) to (256, 256) in the bottom right-hand corner. It is envisaged that other, non-Cartesian, coordinate systems may be used for expressing the positions of the pixels 202. Also, the origin 204 could be placed at a different location, including in the center of the image or at the location of a salient feature of the image itself.

As mentioned above, each of the pixels 202 is associated with a shade value. The range of possible shade values depends on operational requirements. For example, in one specific non-limiting example embodiment, the range of shade values for an 8-bit shade value may be from 0 to 255. In accordance with a specific non-limiting example embodiment of the present invention, the shade value of a pixel 202 represents a level of gray of the pixel 202 and may be referred to as a gray scale value. For example, where 8-bit shade values are used, there are 256 resultant shades, which include absolute black, absolute white and 254 shades of gray in-between.

In other specific non-limiting embodiments, a pixel 202 may initially be associated with a color triplet in a given color space, in which case the shade value of the pixel 202 can represent the outcome of applying a color space processing function to the elements of the color triplet. Thus, for example, the pixel 202 may be associated with the color triplet (a, b, c) in the RGB color space or the YCbCr color space, while the shade value may be defined as, for example, $\text{round}(\sqrt{a^2+b^2+c^2})$ or $\text{round}(\sqrt{a+b+c})$. Naturally, the range of shade values will depend on the ranges of a, b and c.

As mentioned above, the processor 20A is adapted to execute the process 22 to derive the aforementioned code 24 representative of the skin-covered body part 18. With reference now to FIG. 3, as well as FIGS. 2A through 2D, the process 22 is now described.

Step 310

The processor 20A selects a plurality of shade values from the range of shade values for further analysis. Specifically, if there are 256 possible shade values, then a certain number $N \leq 256$ of the shade values will be selected and hereinafter referred to as "designated shade values". The designated shade values may be known in advance by storing them in a database (not shown). The database itself may be stored in the memory 20B or may be accessible remotely through the I/O 20C. Alternatively, selection of the designated shade values may be performed based on a characteristic of the image itself (such as whether the image is perceived to be that of a finger, ear, palm, etc.).

It should be understood that different values of N (i.e., different numbers of designated shade values) may lead to different levels of performance when measured in terms of the rate of false rejection, the rate of false acceptance and computational complexity. Also, depending on the quality and contrast of the digital image 10, the identity of the N designated shade values will also influence these parameters. Thus, it should be appreciated that different designated shade values may need to be used in different circumstances, and it is considered that the process of selecting the designated shade values is a task within the abilities of one skilled in the art.

Step 312

The processor 20A identifies pixels having any of the designated shade values. This step, which can be viewed as performing a filtering operation on the digital image 10, results in a set of pixels that can be arranged to form a first table. The first table can be stored in the memory 20B. For example, the first table may be organized into rows, each row being associated with a given one of the designated shade values. The row associated with a particular designated shade value is either empty or contains either one or more pixels having the particular designated shade value. By saying that a row "contains a pixel" it should be understood that the row actually stores the coordinates of the pixel in question.

Figure 2A:
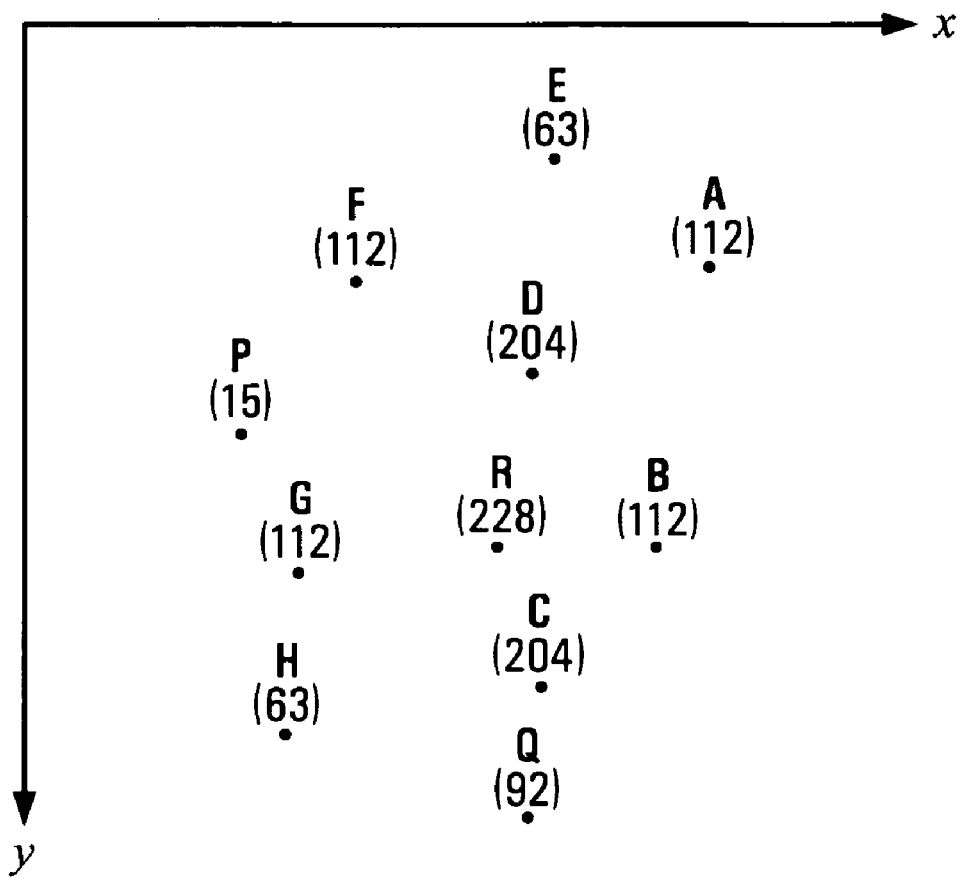
FIGS. 2A-2D show plots of pixels at various stages of a process performed by the biometric apparatus in FIG. 1 to derive the code.
Figure 3:
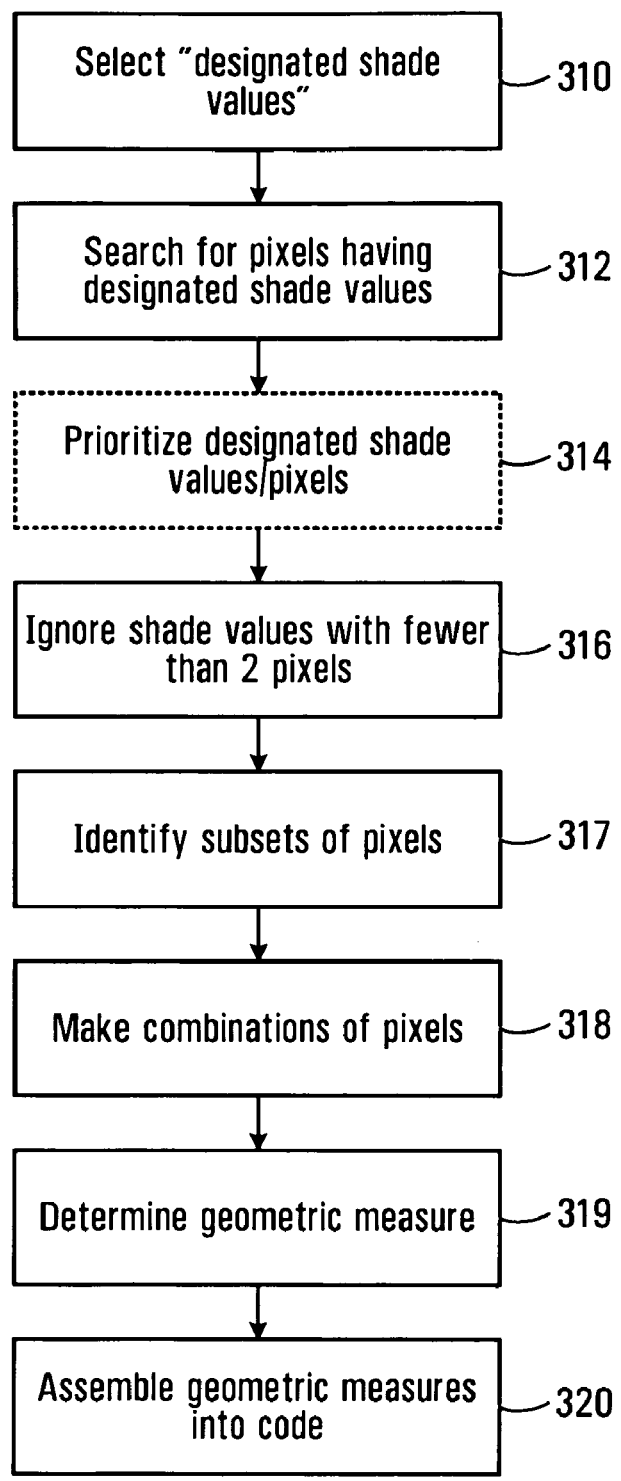
FIG. 3 is a flowchart showing steps in the process performed by the biometric apparatus in FIG. 1 to derive a code from the acquired image.

Consider the following example first table, whose pixels are plotted in FIG. 2A:

| Example first table | |
|---|---|
| Designated shade value | Pixel(s) |
| 15 | P |
| 63 | E, H |
| 77 | |
| 92 | Q |
| 112 | A, B, F, G |
| 186 | |
| 204 | C, D |
| 228 | R |
| 255 | |

Step 314

Of course, it is possible that several neighboring or proximate pixels will each have a shade value that is one of the designated shade values. In this case, it may be advantageous to allow only one of these pixels to be entered into the designated shade table. In order to achieve this effect, and in accordance with optional step 314, it is within the scope of the present invention to prioritize the various designated shade values, such that in the event of two proximate pixels (say, within 8 or 10 pixels of one another) having different designated shade values, one of these shade values will take precedence and the corresponding pixel will be entered into the first table, while the other pixel will be ignored.

Similarly, it is within the scope of the present invention to prioritize different pixel positions, such that in the event of two proximate pixels having the same designated shade value, one of these pixels will take precedence based on its position (e.g., relative to the origin 204 or a particular corner of the digital image 10), while the other pixel will not be entered into the first table. Various other methods for prioritizing nearby pixels will be apparent to those skilled in the art.

Consider the example first table, above, and the corresponding plot in FIG. 2A. Although not explicitly shown in FIG. 2A, it will be generally observed that a pixel-free border has been preserved around each pixel.

Step 316

The processor 20A removes all rows of the first table having fewer than two pixels. The result of step 316 may be the creation of a second table, which may be stored in the memory 20B. The rationale behind this elimination of empty or singleton rows is that useful geometric measures such as distance, area, etc. are not likely to be obtainable from a single pixel (or zero pixels, for that matter).

Consider the example first table, above. Application of step 316 results in the following example second table, whose pixels are plotted in FIG. 2B:

| Example second table | |
|---|---|
| Designated shade value | Pixel(s) |
| 63 | E, H |
| 112 | A, B, F, G |
| 204 | C, D |

Step 317

The processor 20A identifies a plurality of subsets of pixels from the various pixels in the second table created at step 316. Each subset of pixels so identified contains pixels sharing a common one of the designated shade values. The subsets can be identified in the following manner:

First Member of First Subset

To identify the first member of the first subset, the processor 20A may start at an initial search point (ISP) in the digital image 10. The first member of the first subset is identified as the pixel in any of the rows of the second table that is closest to the ISP. By way of example, the ISP may be the aforementioned origin 204 or it may be a different point in the digital image 10. Here, "closeness" may be defined relative to some measure of distance. By way of non-limiting example, the measure of distance between a pixel with coordinates (a,b) and a point with coordinates (c,d) can be the Euclidean distance $\sqrt{(a-c)^2+(b-d)^2}$, or $\min(|a-c|,|b-d|)$ or some other function of a, b, c and d.

Figure 2B:
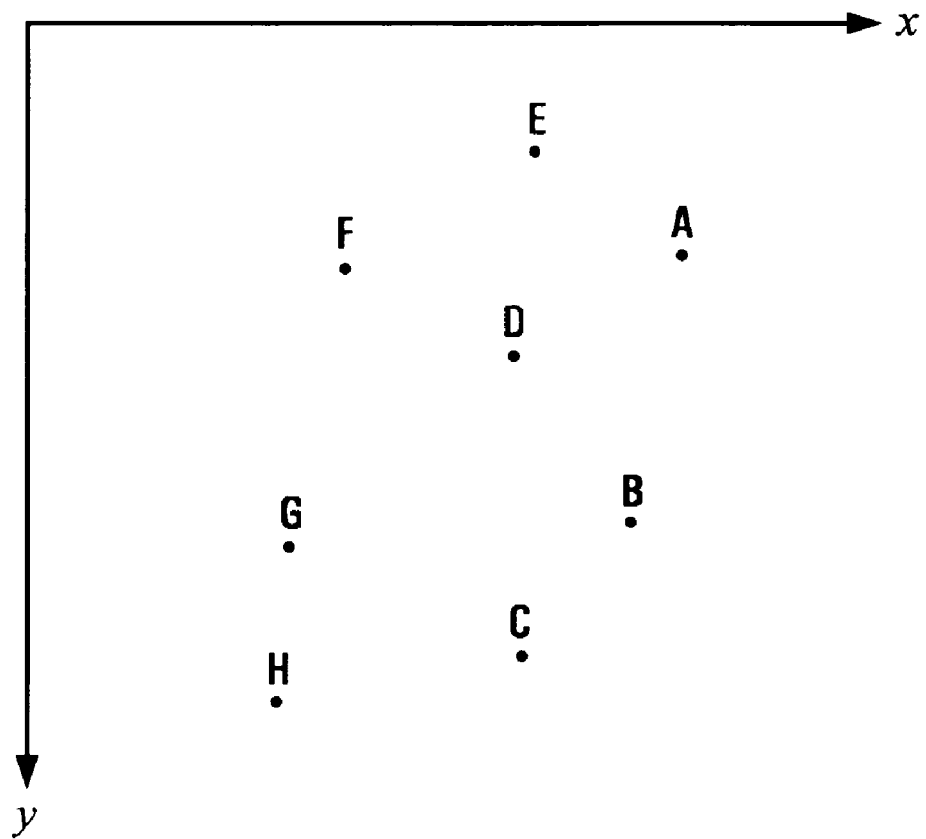
Figure 2C:
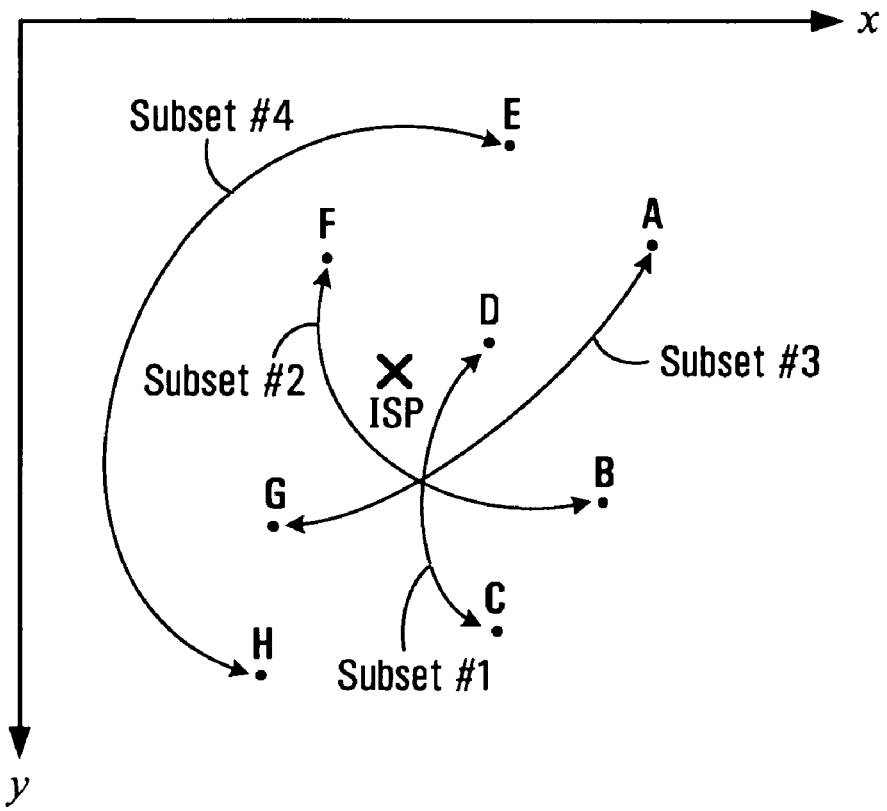

Consider the example second table, above, and the corresponding plot in FIGS. 2B and 2C. By locating the ISP towards the center of the drawing as in FIG. 2C, it will be seen that the closest pixel to the ISP is pixel D. This is the first member of the first subset.

Second Member of First Subset

Once the first member of the first subset has been identified, the processor 20A proceeds to identify the second member of the first subset. The second member of the first subset will be a like-shaded pixel, i.e., it will be in the same row of the second table as the first member of the first subset. Recalling that the rows of the second table each have at least two pixels, it will always be possible to find a second member of a given subset.

Specifically, where the row in question here has exactly two pixels, the second member of the first subset is the other pixel in the same row. Where the row in question here has more than two pixels, the second member of the first subset may be the next nearest like-shaded pixel, where "nearness" is defined relative to some measure of distance.

By way of non-limiting example, the measure of distance between one pixel with coordinates (a,b) and another pixel with coordinates (c,d) can be the Euclidean distance $\sqrt{(a-c)^2+(b-d)^2}$, or $\min(|a-c|,|b-d|)$ or some other function of a, b, c and d. One should keep in mind that alternative embodiments of the invention contemplate that the selection of the second member of a given subset may be based on criteria other than being the closest to the first member and, indeed, on criteria other than a distance altogether.

Consider the plot in FIG. 2C and the example second table, above. It will be seen that the only other pixel having the same shade value as pixel D is pixel C. This is the second member of the first subset.

Where Subsets Have Two Members

In accordance with one specific non-limiting embodiment, each subset is limited to containing a first member and a second member, even if some of the rows of the second table include more than two pixels. Therefore, after having found the first and second members of the first subset, step 317 proceeds with identifying the members of a second subset. Specifically, the first member of the second subset can be the pixel in the second table that is closest to the ISP, while of course ignoring those pixels that are already members of the first subset. Next, the second member of the second subset will be a like-shaded pixel in the same row of the second table as the first member of the second subset. This process continues until a predetermined number say, M, of subsets have been identified, for a total of 2*M pixels (since there are two members in each subset).

Consider again the plot in FIG. 2C and the example second table, above. It will be seen that three other two-member subsets can be formed using step 317, as indicated in the example third table, below. The pixels in the various subsets are plotted in FIG. 2C, with a link drawn between pixels in the same subset:

| Example Third Table | |
|---|---|
| Subset | Pixel(s) |
| #1 (shade value 204) | D, C |
| #2 (shade value 112) | F, B |
| #3 (shade value 112) | G, A |
| #4 (shade value 63) | E, H |

Where Subsets Have More than Two Members

In accordance with another specific non-limiting embodiment, each subset consists of R members (a first member, a like-shaded second member and R−2 like-shaded additional members), and therefore after having found the first and second members of the first subset, step 317 proceeds with identifying the R−2 additional members of the first subset, using much the same technique as was used for identifying the second member of the first subset.

After having identified all the members of the first subset, step 317 proceeds with identifying a second subset, which begins with identifying a first member of the second subset. This can be the pixel in the second table that is nearest the ISP, while of course ignoring those pixels that are members of the first subset. The R−1 other members of the second subset will be like-shaded pixels in the same row of the second table as the first member of the second subset, and so on. This process continues until a predetermined number say, M, of subsets have been identified, for a total of R*M pixels (since there are R members in each subset).

It is noted in both of the above cases that each of the M identified subsets of pixels will contain pixels sharing a common one of the designated shade values.

Step 318

The processor 20A then makes a plurality of combinations of the pixels taken from the various pixels in the aforementioned third table. In the simplest case, each of the combinations of pixels corresponds to an individual one of the previously described subsets of pixels. In a slightly more complex case, each of the combinations of pixels includes members from more than one of the subsets of pixels. Of course, various other ways of mapping the subsets of pixels to combinations of pixels will be apparent to those of ordinary skill in the art, including mappings that result in the number of combinations being different from the number of subsets.

Consider the example third table, above. Assume also that each combination of pixels includes two pixels and, specifically, where the first pixel in the $X^{th}$ combination is the first pixel in the $X^{th}$ subset and where the second pixel in the $X^{th}$ combination is the second pixel in the $((X \text{ MOD } M)+1)^{th}$ subset. This results in the following example fourth table, whose pixels are plotted in FIG. 2D, with a link drawn between pixels in the same combination:

Example Fourth Table

| Combination | Pixel(s) |
|---|---|
| #1 | D, B |
| #2 | F, A |
| #3 | G, H |
| #4 | E, C |

It is noted that the pixels in a given combination do not necessarily have the same shade value.

Step 319

Once the combinations of pixels have been formed and put into the aforementioned fourth table, a geometric measure of the pixels in each combination is determined.

In the simplest case, where each combination of pixels includes only two members, the geometric measure of the two pixels in the combination of pixels may be a measure of distance between the two pixels. By way of non-limiting example, the measure of distance between one pixel with coordinates (a,b) and another pixel with coordinates (c,d) can be the Euclidean distance $\text{sqrt}((a-c)^2+(b-d)^2)$, or $\min(|a-c|, |b-d|)$ or some other predefined function of a, b, c and d. In another non-limiting embodiment, the measure of distance may be a couple $(d_x, d_y)$ defined by $(|a-c|, |b-d|)$.

Figure 2D:
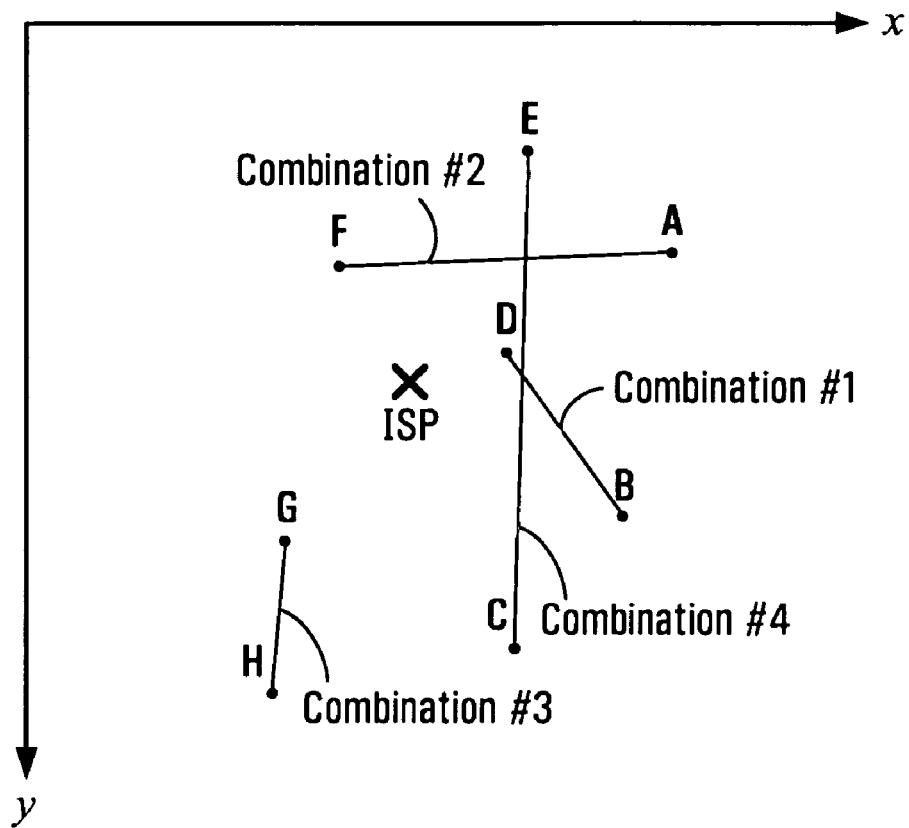

Consider the example fourth table, above, and the corresponding plot in FIG. 2D. The distances between the respective pairs of pixels in each of combinations #1, #2, #3 and #4 can be denoted $\Delta 1$, $\Delta 2$, $\Delta 3$ and $\Delta 4$, respectively.

Where each subset of pixels includes more than two members (say, R members), the geometric measure of the R pixels in the combination of pixels may be the area (in square pixels or the like) of a polygon formed by interconnection of the R pixels; alternatively, the geometric measure could be the average distance between all possible pairs of pixels formed from the R pixels; alternatively, the geometric measure could be the average distance from each pixel to the center of mass of the R pixels; still other geometric measures will be apparent to those skilled in the art.

Step 320

The geometric measures obtained at step 319 are assembled into the code 24 representative of the skin-covered body part 18. This process may be as simple as concatenating the various geometric measures into a binary word, which can have a length on the order of several hundred bits or several kilobits (kb), depending on the number of combinations and on the number of bits used to encode each geometric measure. For example, consider the aforementioned distances $\Delta 1$, $\Delta 2$, $\Delta 3$ and $\Delta 4$. These may be concatenated to give a code

| $\Delta 1$ | $\Delta 2$ | $\Delta 3$ | $\Delta 4$ |
|---|---|---|---|

In a variant, the designated shade values for the geometric measures may also form part of the code 24 and, in fact, an association between the geometric measures and the designated shade values may be built into the code 24.

It is also within the scope of the present invention to enhance security by optionally encrypting the code 24. This can be done in a way that would be understood to a person skilled in the art, including using a public or private key or other cryptographic methods.

It should be understood that some of the steps in FIG. 3 may be preceded or followed by additional image processing operations that alter the digital image 10 to enhance or suppress certain features. Non-limiting examples of additional image processing operations that may be used include thinning, erosion, opening, pruning, thickening, skeletonization, thresholding, etc.

From the above, it will be apparent that the code 24 is derived in such a way that there is a very low probability that different skin-covered body parts will produce the same code 24. That is to say, the code 24 derived from an image of a given skin-covered body part will be unique to that body part. At the same time, it will be recognized that the code 24 in and of itself provides no information about the geometric characteristics of the digital image 10 (such as minutiae in the case of a fingerprint image). In fact, because the code 24 does not reveal information about pixel coordinates within the digital image 10, it would be extremely difficult, if not impossible, to meaningfully reconstruct the digital image 10 on the basis of the code 24 alone.

Hence, it will be appreciated that the approach presented herein is suitable for application in areas of endeavor where privacy concerns are a consideration. Examples of specific areas of application include access control and offender supervision, both of which will now be described in greater detail.

Application #1: Access Control

Figure 6A:
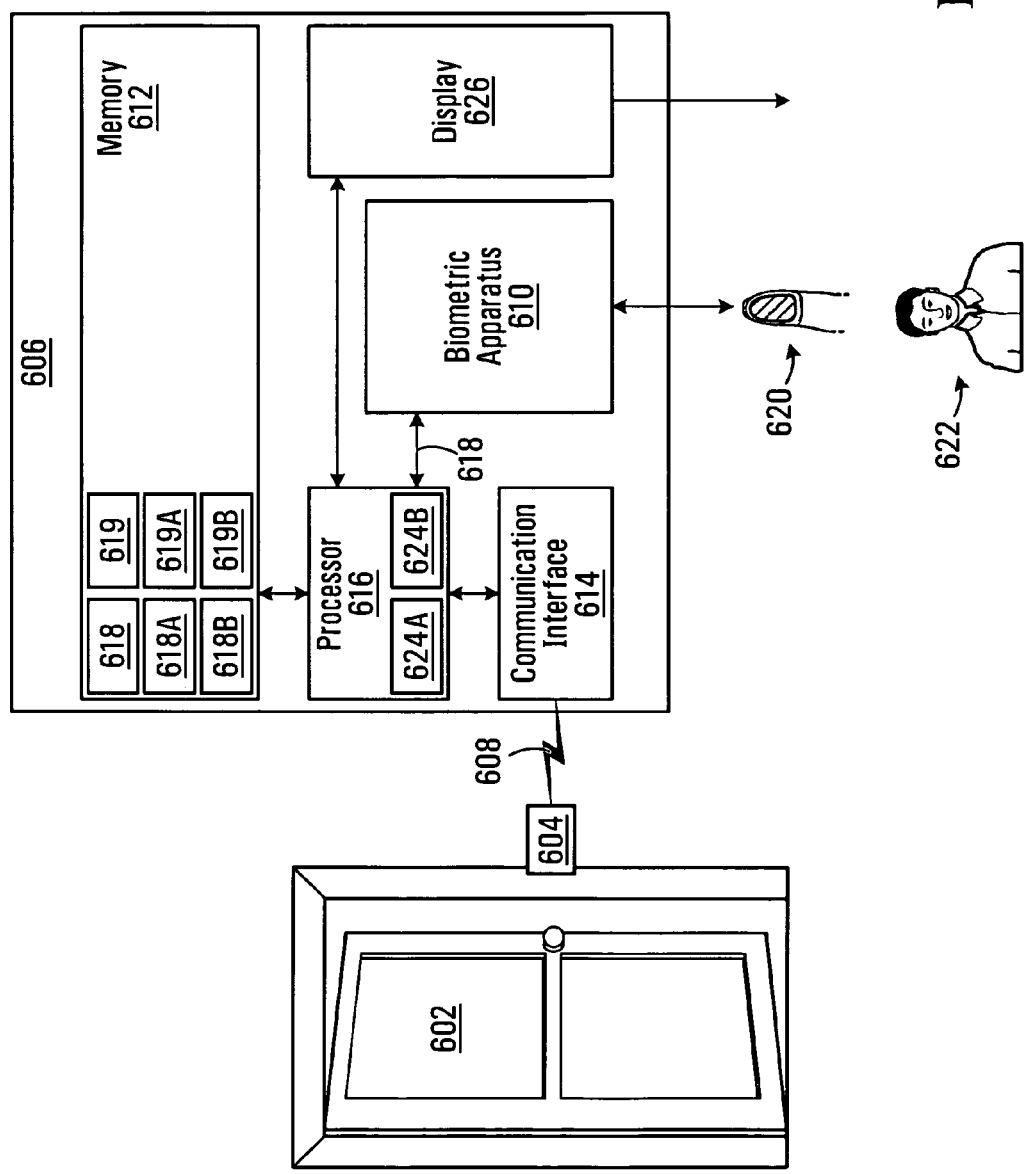
FIGS. 6A and 6B are block diagrams of a system for controlling access through a door, in accordance with an embodiment of the present invention.

With reference now to FIG. 6A, there is shown a system for controlling access through an access point of a facility. In the specific non-limiting example embodiment that will be developed herein below, the access point is a door 602. However, it should be understood that the access point may be something other than a door, such as a turnstile, a window, a vault, a revolving door, an elevator, a gate and so on.

In the specific case where the access point is the door 602, the system includes a door access module 604 and a management entity 606, which are connected to one another by a communication link 608. In some embodiments, the door access module 604 may be individually installed for each door 602, whereas in other embodiments, the door access module 604 may control multiple doors, including door 602. Furthermore, in some embodiments, the door access module 604 may be installed on or in the door 602, whereas in other embodiments, the door access module 604 may be installed on or in the wall next to the door 602. In still other embodiments, especially where multiple doors are to be controlled at the same time from a remote location (e.g., in a prison), the door access module 604 may be installed in an area to which entry is not restricted using the door access module 604. Still other embodiments contemplate installation of the door access module 604 as a component of a wireless handheld device.

In some embodiments, the management entity 606 may be located in a security room or the like. In other embodiments, the management entity 606 may be embodied as a component of a wireless handheld device. In still other embodiments, the management entity 606 may located at premises that are connected to the door access module 604 over at least one network such as the Internet.

Of course, the present invention is not limited to control of a single door and it should be understood that access to any number of doors could be controlled in an identical fashion as will be described for the door 602.

The management entity 606 includes a biometric apparatus 610 (or "biometric module"), a memory 612, a communication interface 614, a processor 616 and a display 626 (or other output device). It should be understood that the words "processor" and "controller" are used in the following merely to distinguish between functionality executed at a central location (by a processor) and functionality executed at a remote location (by a controller). Thus, one will appreciate that this has been done for the sole purpose of improving readability, and is not intended to limit the scope of either the term "processor" or "controller". Rather, the two terms are to be interpreted broadly, as referring to entities capable of executing various processing and/or control functions.

The biometric apparatus 610 is operable to produce a code 618 on the basis of an object submitted to it during a so-called "registration" process. In the expected scenario, the object submitted to the biometric apparatus 610 is a skin-covered body part 620 of a user 622 who is authorized to have some level of authorization to open the door 602. Thus, the code 618 will be representative of the skin-covered body part 620 of the user 622. In accordance with an embodiment of the present invention, the code 618 is derived based on geometric measures of combinations of pixels taken from a plurality of subsets of like-shaded pixels in an image of the skin-covered body part 620. An example of a suitable technique for generation of the code 618 may be based on that described above with reference to FIG. 3.

The memory 612 is used to store the code 618 along with other access control information 619 for the user 622, such as an identity of the user 622 (e.g., a user ID), access restrictions (e.g., time-of day and/or day-of-week), a history of previous accesses to the door 602, and so on. Similarly, the memory 612 stores other codes 618A, 618B for other registered users in addition to respective access control information 619A, 619B similar to the preceding. Of course, where multiple doors exist, the access control information for various users may be stored on a per-door basis. However, and for the sole purpose of simplifying the description, it is assumed that there is only one door (i.e., the door 602).

In order to reduce the risk of personal information being leaked or stolen from the memory 612, the code 618 output by the biometric apparatus 610 should not provide sufficient information to allow reconstruction of a meaningful image of the skin-covered body part 620 from which the code 618 was derived. To this end, the biometric apparatus 610 is preferably the biometric apparatus 12 described above with reference to FIGS. 1-4, 5A and 5B.

The communication interface 614 allows the management entity 606 to communicate with the door access module 604 over a communication link 608. In one specific non-limiting embodiment, the communication link 608 is a wireless link. One advantage of a wireless link is that cabling between the management entity 606 and the door access module 604 is not required, thus potentially lowering costs. In another specific non-limiting embodiment, the communication link 608 is a LAN (e.g., an Ethernet link). Although cabling is required in this case, one advantage of an Ethernet link is that radio-frequency interference and jamming are no longer a concern, while another advantage is that the door access module 604 can actually be powered from the Ethernet link. Still other options for the communication link 608 will be apparent to those skilled in the art.

The processor 616 runs a registration process 624A and a monitoring process 624B, both of which will be described in greater detail later on; for now, suffice it to say that during the registration process 624A for the user 622, the processor 616 looks up the code 618 and the related access control information 619 for the user 622 in the memory 612 and sends this data to the door access module 604 to enable access control to be effected at the door 602 itself. On the other hand, during the monitoring process 624B, the processor 616 receives information about attempts to open the door 602, logs this information in the memory 612 and may perform further processing. Some of the further processing may result in an alarm that may be displayed on the display 626 or conveyed via another output device, such as an antenna in communication with a wireless device (e.g., SMS-enabled phone, networked wireless personal digital assistant, etc.)

The functionality of the processor 616 may be implemented as pre-programmed hardware or firmware elements (e.g., application specific integrated circuits (ASICs), electrically erasable programmable read-only memories (EEPROMs), etc.), or other related components. In other embodiments, the processor 616 may be implemented as an arithmetic and logic unit (ALU) or a neural processor having access to a code memory (not shown) which stores program instructions for the operation of the ALU. The program instructions could be stored on a medium which is fixed, tangible and readable directly by the processor 616, (e.g., removable diskette, CD-ROM, ROM, fixed disk, USB drive), or the program instructions could be stored remotely but transmittable to the processor 616 via a modem or other interface device.

Figure 6B:
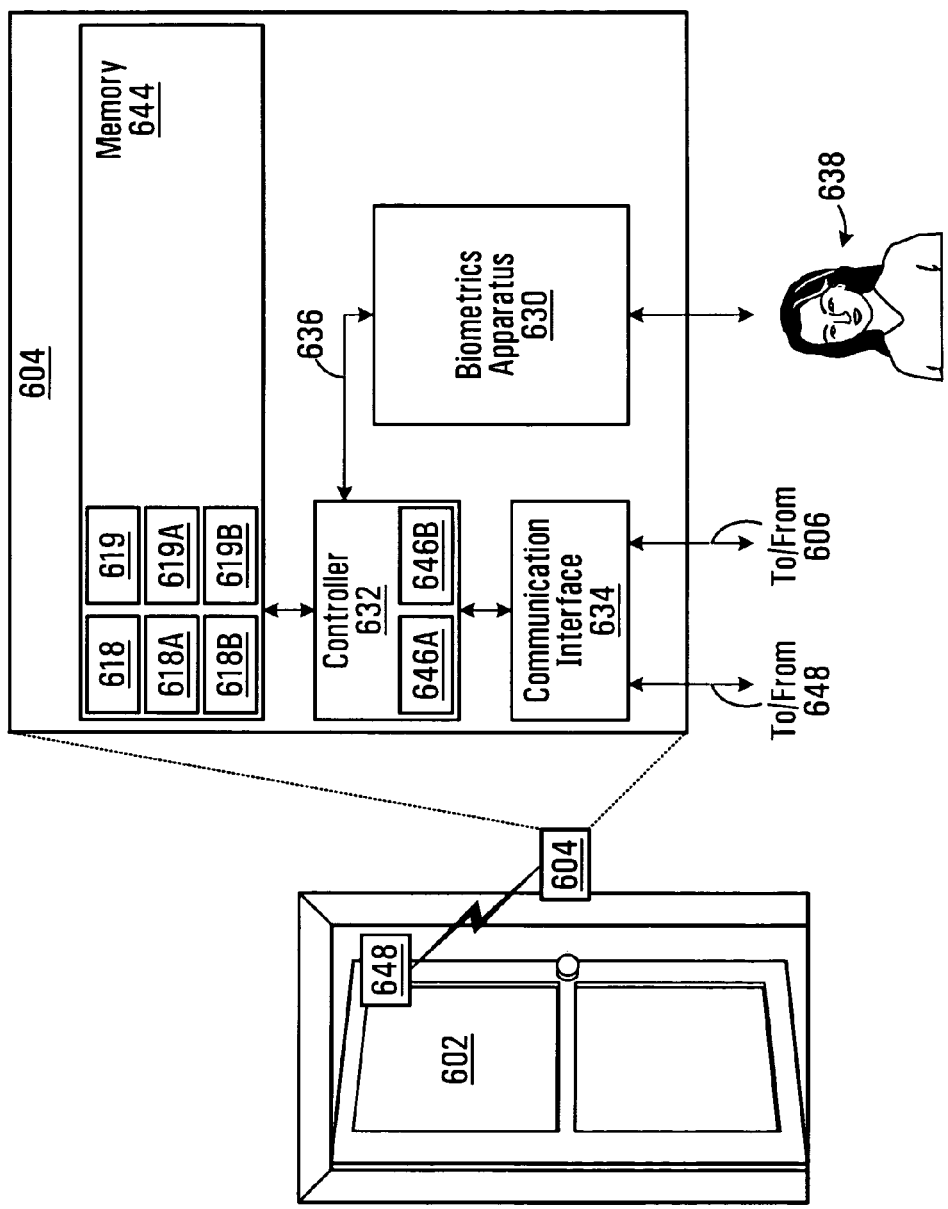

With additional reference to FIG. 6B, the door access module 604 includes a biometric apparatus 630, a controller 632, a communication interface 634 and a memory 644.

The biometric apparatus 630, which can be embodied as the biometric apparatus 610, produces a code 636 on the basis of an object submitted to it by a given user 638 who is attempting to open the door 602. When the given user 638 is one of the registered users (e.g., user 622 or other registered user), then it is expected that the object submitted to the biometric apparatus 630 will be whichever skin-covered body part of the given user 638 was employed when registering with the management entity 606. However, it is possible that other objects may be submitted to the biometric apparatus 630 by the given user 638. It is also possible that the given user 638 is not a registered user.

The communication interface 634 is operative to communicate with the management entity 606. It is also within the scope of the present invention for the communication interface 634 to allow communication between the door access module 604 and other door access modules on other doors, or other entities such as communication devices worn by security guards.

The memory 644 stores the codes 618, 618A, 618B and the related access control information 619, 619A, 619B, as received from the management entity 606 via the communication interface 634 following registration of various users including user 622.

The controller 632 has access to the memory 644, the communication interface 634 and the biometric apparatus 630. The controller 632 runs a registration process 646A and a monitoring process 646B, both of which will be described in greater detail later on; for now, suffice it to say that during the registration process 646A, the controller 632 receives codes and related access control information from the management entity 606 via the communication interface 634 and stores this information in the memory 644.

During the monitoring process 646B, the controller 632 responds to attempts to open the door 602 by controlling a door restraint mechanism 648 by wired or wireless techniques via the communication interface 634. This gives the door access module 604 the ability to release the door 602, thus allowing it to be opened from a closed state. Any suitable door restraint mechanism 648 can be used, such as latch-based, electromagnetic, etc. In addition, during the monitoring process 646B, the controller 632 collects information regarding attempts being made to open the door 602 and sends this information to the management entity 606 via the communication interface 634 (or may keep this information in the memory 644 until receipt of a request from the management entity 606 to read the information).

It is noted that the use of wireless communication between the controller 632 and the door restraint mechanism 648 may be particularly useful when the door 602 is made of a material or structure that is not amenable to installation of the door access module 604.

In some embodiments (where the door 602 is made of a metal or comprises portions made of a metal), it may be advantageous to locate the door restraint mechanism 648, if electromagnetic nature in nature, on or in the door frame. On the other hand, in some embodiments (where the door restraint mechanism 648 is connected to the door handle), the door restraint mechanism 648 may be located entirely within or on the door. Generally, it should be understood that the door restraint mechanism 648 may have components that reside off of the door 602 and/or components that reside on the door 602 itself.

The functionality of the controller 632 may be implemented as pre-programmed hardware or firmware elements (e.g., application specific integrated circuits (ASICs), electrically erasable programmable read-only memories (EEPROMs), etc.), or other related components. In other embodiments, the controller 632 may be implemented as an arithmetic and logic unit (ALU) or a neural processor having access to a code memory (not shown) which stores program instructions for the operation of the ALU. The program instructions could be stored on a medium which is fixed, tangible and readable directly by the controller 632, (e.g., removable diskette, CD-ROM, ROM, fixed disk, USB drive), or the program instructions could be stored remotely but transmittable to the controller 632 via a modem or other interface device.

Figure 7:
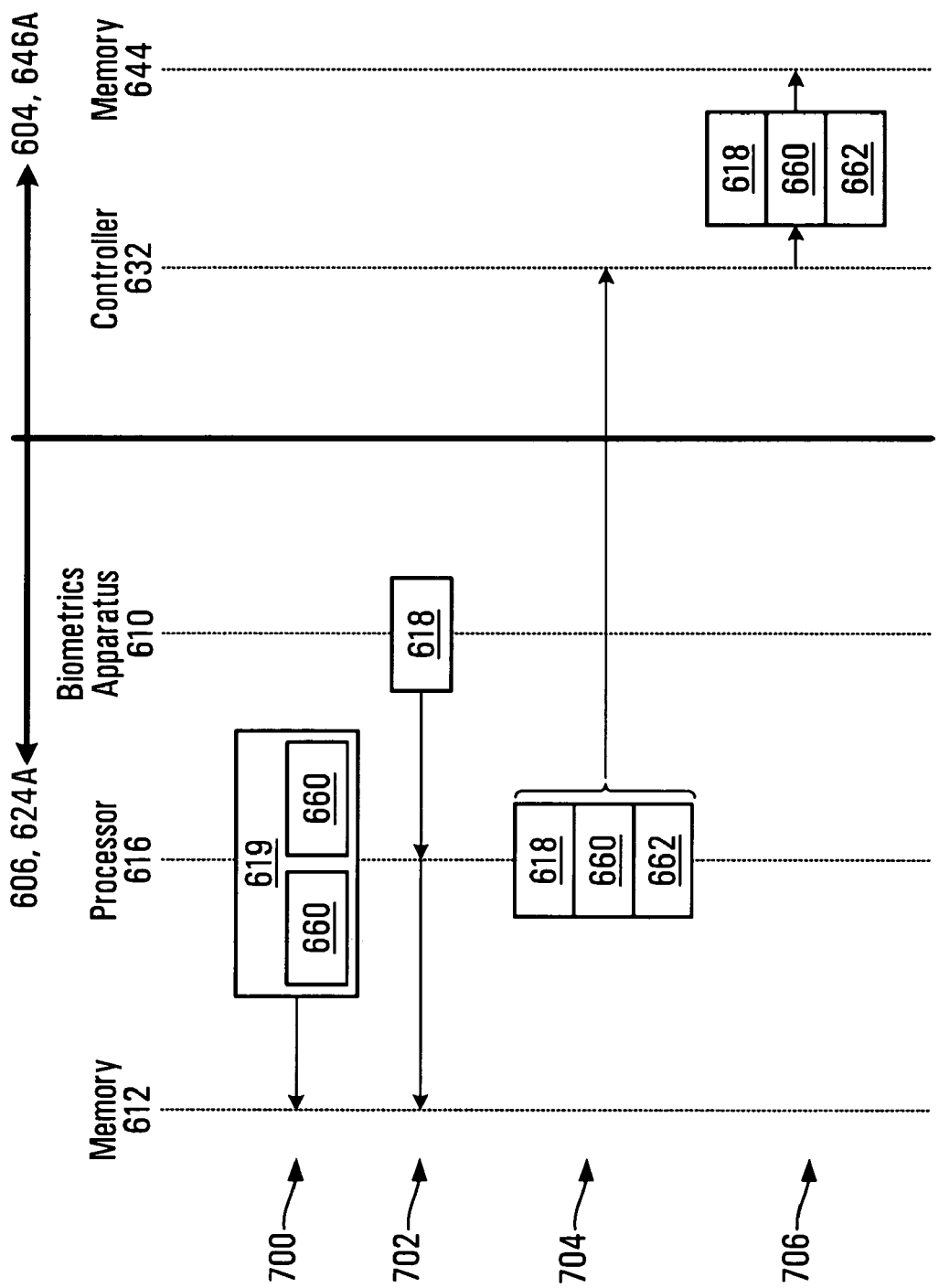
FIG. 7 is a flow diagram showing steps in a registration process executed at a management entity and at a door access module in the system of FIGS. 6A and 6B, in accordance with an embodiment of the present invention.

The registration process 624A run by the processor 616 in the management entity 606 and the registration process 646A run by the controller 632 in the door access module 604 are now described with reference to the flow diagram in FIG. 7, for the purposes of which it is assumed the user 622 is desirous of being registered.

Specifically, at step 700 of the registration process 624A, the processor 616 obtains the access control information 619 regarding the user 622. The access control information 619 may include, inter alia, an identity of the user 622 (e.g., a user ID 660), access restrictions 662 (e.g., time-of day and/or day-of-week), a history of previous accesses to the door 602, and so on. It should be understood that some of the access control information 619 may be provided by an external database (not shown). The access control information 619 for the user 622 is stored in the memory 612.

At step 702 of the registration process 624A, the processor 616 obtains the code 618 that the biometric apparatus 610 derives from the user's skin-covered body part 620. The code 618 is also stored in the memory 612, in association with the access control information 619 for the user 622.

At step 704 of the registration process 624A, and assuming that the user 622 is indeed authorized to at least sometimes open the door 602, the processor 616 sends the code 618 and the user ID 660 of the user 622 to the door access module 604 via the communication link 608. If the access control information 619 for the user 622 specifies certain restrictions on the user's access to the door 602, then such access restrictions 662 are also sent to the door access module 604 via the communication link 608.

At step 706 of the registration process 646A, the controller 632 receives via the communication interface 634 the code 618, the user ID 660 of the user 622 and possibly certain access restrictions 662 associated with the user 622. The code 618, the user ID 660 and the access restrictions 662 (if any) are stored in the memory 644.

Of course, the above steps are performed for the various other doors to which the user 622 may have access, as well as for the various other users who undergo registration. As new users are registered or access restrictions fluctuate, the above steps can be performed as needed.

Also, in an alternative embodiment, step 704 may be performed using an intermediary such as a smart card. Specifically, the code 618, the user ID 660 of the user 622 and the relevant access restrictions 662 associated with the user 622 can be placed onto a medium such as a smart card that is physically transported to the door access module 604, which downloads the information as required.

Figure 8:
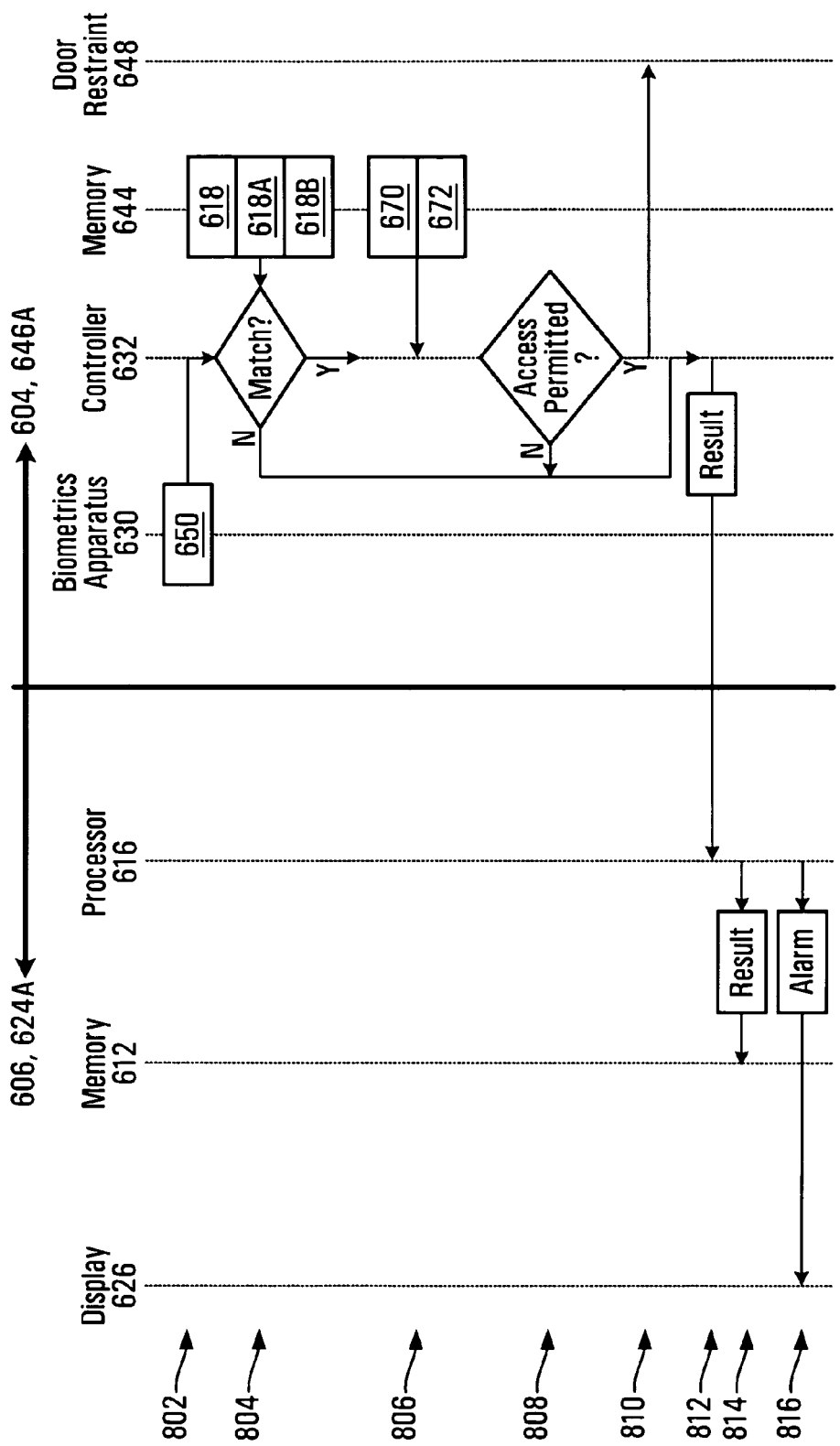
FIG. 8 is a flow diagram showing steps in a monitoring process executed at the management entity and at the door access module in the system of FIGS. 6A and 6B, in accordance with an embodiment of the present invention.

The monitoring process 624B run by the processor 616 in the management entity 606 and the monitoring process 646B run by the controller 632 in the door access module 604 are now described with reference to the flow diagram in FIG. 8, in which an as yet unidentified person makes an attempt to open the door 602.

Specifically, at step 802 of the monitoring process 646B, the controller 632 communicates with the biometric apparatus 630 to obtain a code 650 therefrom. At this stage, it is still not known whether the person is authorized to open the door 602.

At step 804 of the monitoring process 646B, the controller 632 consults the memory 644 and compares the received code 650 to the various codes stored therein (e.g., codes 618, 618A, 618B). If there is a match between the code 650 and the code corresponding to a given registered user, then the next step is step 806; otherwise the next step is step 812.

At step 806 of the monitoring process 646B, the controller 632 extracts from the memory 644 the user ID (denoted 670) and the access restrictions (denoted 672) stored in association with the code that matches the code 650 received from the biometric apparatus 630.

At step 808 of the monitoring process 646B, the controller 632 checks the access restrictions 672 to see whether the person attempting to access has the requisite authority. Thus, the controller 632 may establish that the person, although registered, does not necessarily have authority to open the door 602 at the current time, or during the current day of the week, etc. If access is permitted, the next step is step 810; otherwise the next step is step 812.

At step 810 of the monitoring process 646B, the controller 632 sends a signal to the door restraint mechanism 648, which releases the door 602 and allows it to be opened. The door restraint mechanism 648 may be configured such that if the door 602 is not opened after a certain amount of time, the door will once again be restrained. Also, the door restraint mechanism 648 may be configured such that once the door 602 is opened, it will once again be restrained as soon as it is closed.

At step 812 of the monitoring process 646B, which is optional, the controller 632 reports the result of the current access attempt to the management entity 606 via the communication interface 634. For example the result of the current access attempt may be "success for user ID xyz", "failure due to unrecognized user", "failure for user ID xyz due to unauthorized time period", etc. Here, "xyz" refers to the information conveyed by the user ID 672.

It is noted that if step 812 is reached directly from step 804 or step 808, then step 810 will not be performed and hence the door 602 will remain closed under the effect of the door restraint mechanism 648.

At step 814 of the monitoring process 624B, the processor 616 receives the result of the current access attempt via the communication interface 614. If the result is "success for user ID xyz" or "failure for user ID xyz due to unauthorized time period", the result may simply be stored in the memory 612 as part of the access control information (specifically, the history of previous accesses to) for the user having user ID xyz.

At step 816 of the monitoring process 624B, the processor 616 verifies certain conditions and if they are met, signals an alarm. This can be done when the result of the current access attempt is "failure due to unrecognized user", which may cause the processor 616 to trigger an alarm to be displayed over the display 626 or conveyed over another output device, or relayed to a security guard, etc. An alarm could also be triggered under a variety of other conditions, even if the person attempting to open the door 602 is a registered user. For example, if the same registered user goes in and out too often, or if a registered user makes multiple failed attempts during a restricted time period, or if a registered user appears to be going through two different doors at about the same time, etc.

In a variant of the above-described embodiment, one may eliminate steps 704 and 706 of the registration process, while making steps 804 to 806 the responsibility of the processor 606 in the management entity 616. The scenario envisaged by this variant is one in which there is minimal processing done at the door access module 604, with the exception of code generation. Specifically, the code derived from a skin-covered body part would be sent to the controller 616 in the management entity 606. The controller 616 would then be responsible for verifying whether there is a match with any of the codes that correspond to people authorized to enter through the door 602 at the given time. If a match is found, the controller 616 would send a signal to the controller 632 which, in turn, causes the controller 632 to send a signal to the door restraint mechanism 648 to allow the door 602 to be opened. It is therefore seen that most of the comparison is centralized at the management entity 606, which may simplify access management and may allow the implementation of less expensive door access modules 604.

In view of the foregoing, it is noted that use of biometrics, and more specifically skin-covered body parts, in the above system allows authentication of registered users to be achieved to a high degree of accuracy. Meanwhile, the information stored in the memory 612 of the management entity 606 (and in the memory 644 of the door access module 604) is of a nature that does not allow a malicious user who obtains this information to extract any meaningful personal information about the registered users. In addition, the use of a controller local to each door reduces the power consumption of the door access module 604, to a point where connection to the standard AC power grid is not required. This, in turn, has the effect of reducing the installation cost for the door access module 604. Of course, the option still exists to connect the door access module 604 to the AC power grid.

Application #2: Offender Supervision

Figure 9:
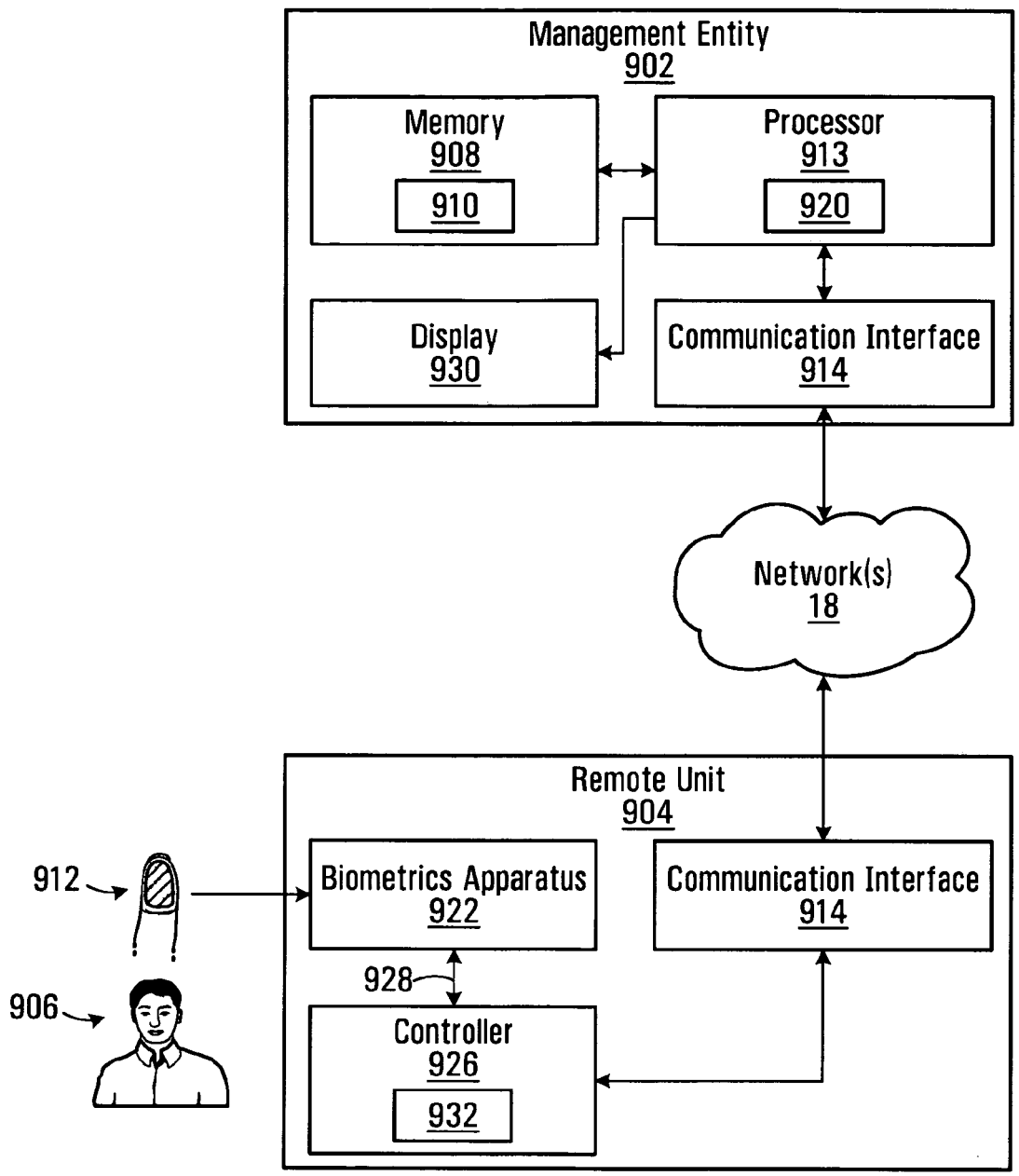
FIG. 9 is a block diagram of a system for electronic supervision of offenders, in accordance with an embodiment of the present invention.

"House arrest" allows an offender who is sentenced to a jail term to spend the time at his or her home as an alternative to being physically confined to jail. In some cases, it is necessary to confirm that the offender is indeed at home. With reference now to FIG. 9, there is shown a system for electronic supervision of offenders under conditions of house arrest, in accordance with an embodiment of the present invention. The system includes a management entity 902 and a remote unit 904. It is envisaged that the management entity 902 may be located, for example, at a corrections center or government office, whereas the remote unit 904 is located at a residential address or other location where an offender 906 is required to be physically located at certain specified times.

Communication between the management entity 902 and the remote unit 904 is established over one or more networks 918. A suitable example of a network 918 between the management entity 902 and the remote unit 904 is the PSTN. In such a case, it is envisaged that the remote unit 904 may be connected to a conventional telephone outlet at the aforementioned residential address. Still other arrangements are possible, such as connection via a cable distribution network, fixed wireless network, data network, etc.

The management entity 902 includes a memory 908 that stores a code (or a plurality of codes) 910 representative of a skin-covered body part 912 of the offender 906. It is assumed that the code (or codes) 910 will have been derived from the offender's skin-covered body part 912 during a registration process, using a technique that is based on geometric measures of combinations of pixels taken from a plurality of subsets of like-shaded pixels in an image of the skin-covered body part 912. An example of a suitable technique for generation of the code (or codes) 910 may be based on that described above with reference to FIG. 3. A plurality of codes 910 may be used to reduce the rate of false rejection, by accounting for slight deviations in the result of encoding images acquired from real-life body parts.

The management entity 902 also includes a processor 913 and a communication interface 914. The communication interface 914 connects the management entity 902 to the aforementioned one or more networks 918 (e.g., the PSTN). In a specific non-limiting example embodiment, the communication interface 914 is a modem. The processor 913 runs a supervision process 920, which will be described in greater detail later on; for now, suffice it to say that the supervision process 920 operates to assess whether a code received from the remote unit 904 is representative of the skin-covered body part 912 of the offender 906. The management entity 902 further includes a display 930 or other output device, for communicating the result of the supervision process to an operator or a command station, for example.

The functionality of the processor 913 may be implemented as pre-programmed hardware or firmware elements (e.g., application specific integrated circuits (ASICs), electrically erasable programmable read-only memories (EEPROMs), etc.), or other related components. In other embodiments, the processor 913 may be implemented as an arithmetic and logic unit (ALU) or a neural processor having access to a code memory (not shown) which stores program instructions for the operation of the ALU. The program instructions could be stored on a medium which is fixed, tangible and readable directly by the processor 913, (e.g., removable diskette, CD-ROM, ROM, fixed disk, USB drive), or the program instructions could be stored remotely but transmittable to the processor 913 via a modem or other interface device.

The remote unit 904 includes a biometric apparatus 922, a communication interface 924 and a controller 926. The biometric apparatus 922 produces a code 928 on the basis of an object submitted to it. In the expected scenario, the object submitted to the biometric apparatus 922 is the skin-covered body part 912 of the offender 906. However, it is possible that other objects may be submitted to the biometric apparatus 922, which may especially occur when the offender 906 is attempting to "fool" the management entity 902 into believing that he or she is present, or quite simply, when the offender 906 is absent.

In order to reduce the likelihood of transmitting personal information over the one or more networks 918, the code 928 output by the biometric apparatus 922 should not provide information allowing reconstruction of a meaningful image of the skin-covered body part 912. To this end, the biometric apparatus 922 is preferably the biometric apparatus 12 described above with references to FIGS. 1-4, 5A and 5B.

The communication interface 924 connects the remote unit 904 to the aforementioned one or more networks 918 (e.g., the PSTN). In a specific non-limiting example embodiment, the communication interface 924 is a modem. The controller 926 runs a gathering process 932 that communicates with the management entity 902 via the communication interface 924, and also with the biometric apparatus 922.

The functionality of the controller 926 may be implemented as pre-programmed hardware or firmware elements (e.g., application specific integrated circuits (ASICs), electrically erasable programmable read-only memories (EEPROMs), etc.), or other related components. In other embodiments, the controller 926 may be implemented as an arithmetic and logic unit (ALU) or a neural processor having access to a code memory (not shown) which stores program instructions for the operation of the ALU. The program instructions could be stored on a medium which is fixed, tangible and readable directly by the controller 926, (e.g., removable diskette, CD-ROM, ROM, fixed disk, USB drive), or the program instructions could be stored remotely but transmittable to the controller 926 via a modem or other interface device.

The gathering process 932, in conjunction with the supervision process 920 run by the processor 913 of the management entity 902, will now be described in greater detail with reference to FIG. 10.

Specifically, at step 1002, the processor 913 in the management entity 902 begins by determining that it is time to gather presence information regarding the offender 906. This determination may be made on a basis of a pre-determined schedule or it can be made on a basis of having received an operator request. The processor 913 contacts the remote unit 904 using the communication interface 914, which causes the gathering process 932 to be invoked at the remote unit 904. Accordingly, the processor 913 in the management entity 902 and the controller 926 in the remote unit 904 establish communication with one another (e.g., by a handshaking protocol involving the communication interfaces 914 and 924, respectively).

At step 1006, the controller 926 in the remote unit 904 prompts the offender 906 to submit the skin-covered body part 912. This can be done via an output device (not shown), such as by emitting a tone or message over a loudspeaker. After a certain grace period (e.g., 30 seconds), the controller 926 communicates with the biometric apparatus 922 at step 1008 to obtain a code 928 therefrom. Of course, the controller 926 does not know whether the offender 906 has actually placed his or her body part 912 onto the platen of the biometric apparatus 922. In fact, it may not even be known whether anything at all was submitted to the biometric apparatus 922. Thus, the code 928 provided by the biometric apparatus 922 will be derived from an image of an apparent object that may or may not be the skin-covered body part 912.

In order to make an assessment of whether or not the skin-covered body part 912 was submitted to the biometric apparatus 922, step 1010 consists of the controller 926 releasing the code 928 to the management entity 902 via the communication interface 924 and the one or more networks 918. This signals the end of the gathering process 932. Meanwhile, the code 928 is received at the communication interface 914 of the management entity 902 and is processed by the processor 913.

Specifically, at step 1012, the processor 913 consults the memory 908 and compares the code 928 to the code (or codes) 910, which are known to have been derived from an acquired image of the offender's skin-covered body part 912. If the comparison yields a match between the code 928 and the code 910 (or any of the codes 910 when there are more than one) in the memory 908, then presence of the offender 906 is deemed verified and the result of the supervision process 920 is considered to be a success; otherwise presence of the offender 906 is deemed not verified and the result of the supervision process 920 is considered to be a failure. At step 1014, the processor 913 may signal the result of the supervision process 920 via the display 930 or other output device.

Of course, variations of the above are possible. For example, at step 1012, even if the comparison does not yield a match between the code 928 and the code 910 (or any of the codes 910 when there are more than one), then it is within the scope of the present invention to allow a limited number of "re-tries" to further reduce the false rejection rate. Specifically, the biometric apparatus 922 derives additional codes from acquired images of whatever is deemed to have been submitted to it. In this way, a poorly positioned body part may be repositioned with a greater chance of the supervision process 920 yielding a successful result.

Also, it is envisaged that the determination as when to gather presence information regarding the offender 906 may be programmed within the controller 926 of the remote unit 904 (rather than the management entity 902). Hence, step 1004, by virtue of which communication between the management entity 902 and the remote unit 904 is established, would be initiated by the controller 926 in the remote unit 904.

Additionally, it should be understood that for added security, the code 928 may itself include encrypted information, or the code 928 may be encrypted by the controller 926 in the remote unit 904 and decrypted by the processor 913 in the management entity 902.

In view of the foregoing, it is noted that use of biometrics, and more specifically skin-covered body parts, in the above system allows the presence of the offender 906 to be verified to a high degree of accuracy. Meanwhile, the information exchanged between the management entity 902 and the remote unit 904 (and stored in the memory 908) is of a nature that does not allow a malicious user who intercepts this information, and possibly even decrypts it, to obtain any meaningful personal information about the offender 906. In addition, the amount of information exchanged over the one or more networks 18 is sufficiently small that it can be transmitted to the management entity 902 in a reasonable amount of time.

It will be appreciated that the system described above may be used in an identical fashion to enable parents to electronically supervise their children or in any other situation where it is desired to "check up" on individuals expected to be at a fixed location.

Those skilled in the art will be able to conceive of still further applications of the biometric apparatus 12 and the techniques used by the biometric apparatus 12 to derive a code from an acquired image of a skin-covered body part.

While specific embodiments of the present invention have been described and illustrated, it will be apparent to those skilled in the art that numerous modifications and variations can be made without departing from the scope of the invention as defined in the appended claims.

What is claimed is:

1. A method of obtaining a digital code representative of a skin-covered body part, the method including:
    acquiring, in a processing device, an image of the skin-covered body part, the image including a plurality of pixels, each pixel having an associated shade value in a range of shade values;
    identifying a plurality of subsets of pixels from the plurality of pixels, each subset of pixels including at least two pixels having a common one of a plurality of designated shade values in the range of shade values;
    for each of a plurality of combinations of pixels taken from the pixels in the subsets of pixels, determining a geometric measure of the pixels in said combination;
    encoding the geometric measures into a digital code for the skin-covered body part; and
    outputting the digital code from the processing device.

2. The method defined in claim 1, wherein said acquiring an image of the skin-covered body part is performed by a CMOS charge-coupled device.

3. The method defined in claim 1, wherein the image is derived from a live scan of the skin-covered body part pressed onto a platen.

4. The method defined in claim 1, wherein said identifying a plurality of subsets of pixels from the plurality of pixels includes identifying a first subset of pixels and identifying a second subset of pixels.

5. The method defined in claim 4, wherein said identifying a first subset of pixels includes:
    identifying a first pixel having any of the designated shade values;
    identifying a second pixel having the same designated shade value as the first pixel;
    wherein the first subset of pixels includes said first and second pixels.

6. The method defined in claim 5, wherein said identifying a second subset of pixels includes:
    identifying a third pixel having any of the designated shade values;
    identifying a fourth pixel having the same designated shade value as the third pixel;
    wherein the second subset of pixels includes said third and fourth pixels.

7. The method defined in claim 6, wherein identifying the first pixel includes identifying which pixel having the designated shade value is nearest a reference point in the image.

8. The method defined in claim 7, wherein identifying the second pixel includes identifying which pixel having the designated shade value is nearest the first pixel.

9. The method defined in claim 7, wherein identifying the second pixel includes identifying which pixel separated from the first pixel by at least a minimum distance and having the designated shade value is nearest the first pixel.

10. The method defined in claim 7, wherein identifying the second pixel includes identifying which pixel having the designated shade value is second nearest the reference point.

11. The method defined in claim 7, wherein identifying the second pixel includes identifying which pixel separated from the first pixel by at least a minimum distance and having the designated shade value is second nearest the reference point.

12. The method defined in claim 11, wherein the reference point is a center of the image.

13. The method defined in claim 11, wherein the reference point is a corner of the image.

14. The method defined in claim 11, wherein the reference point is a salient feature of the image.

15. The method defined in claim 14, further including identifying the salient feature of the image.

16. The method defined in claim 1, further including consulting a database to obtain the designated shade values.

17. The method defined in claim 1, wherein the plurality of designated shade values are pre-determined and independent of the image.

18. The method defined in claim 1, further including selecting the plurality of designated shade values on a basis of a characteristic of the image.

19. The method defined in claim 1, wherein the designated shade values are grayscale values.

20. The method defined in claim 1, wherein the range of shade values includes 256 grayscale values.

21. The method defined in claim 1, wherein each said combination of pixels includes a respective first pixel and a respective second pixel, and wherein determining a geometric measure of the pixels in a particular one of the plurality of combinations includes determining a distance between the respective first pixel and the respective second pixel.

22. The method defined in claim 21, wherein said determining a distance between the respective first pixel and the respective second pixel includes determining a number of pixels separating the respective first pixel and the respective second pixel.

23. The method defined in claim 21, wherein said determining a distance between the respective first pixel and the respective second pixel includes determining a first number of pixels separating the respective first pixel and the respective second pixel along a first direction and determining a second number of pixels separating the respective first pixel and the respective second pixel along a second direction orthogonal to the first direction.

24. The method defined in claim 1, wherein each said combination of pixels includes at least three respective pixels.

25. The method defined in claim 24, wherein determining a geometric measure of the pixels in a particular one of the plurality of combinations includes determining an average distance among all pairs of the at least three respective pixels.

26. The method defined in claim 24, wherein determining a geometric measure of the pixels in a particular one of the plurality of combinations includes determining an area of a polygon constructed from the at least three respective pixels.

27. The method defined in claim 24, wherein determining a geometric measure of the pixels in a particular one of the plurality of combinations includes determining an average distance to a center of mass of the at least three respective pixels.

28. The method defined in claim 1, wherein each combination of pixels includes a plurality of pixels taken from the same subset of pixels.

29. The method defined in claim 1, wherein all the pixels in a particular one of the combinations of pixels are taken from the same subset of pixels.

30. The method defined in claim 1, wherein each combination of pixels includes at least two pixels taken from different subsets of pixels.

31. The method defined in claim 1, wherein said encoding the geometric measures into a digital code includes concatenating the geometric measures into the digital code.

32. The method defined in claim 1, further including encoding the designated shade values into the digital code.

33. The method defined in claim 1, further including encrypting the digital code.

34. The method defined in claim 1, wherein the skin-covered body part includes a finger tip.

35. The method defined in claim 1, wherein the skin-covered body part does not includes a finger tip.

36. The method defined in claim 1, wherein the skin-covered body part includes a nose tip.

37. The method defined in claim 1, wherein the skin-covered body part includes a palm of a hand.

38. The method defined in claim 1, wherein the skin-covered body part includes an ear.

39. A computer-readable storage medium containing a program element for execution by a computing device to implement a method of obtaining a digital code representative of a skin-covered body part, the program element including:
   program code means for acquiring an image of the skin-covered body part, the image including a plurality of pixels, each pixel having an associated shade value in a range of shade values;
   program code means for identifying a plurality of subsets of pixels from the plurality of pixels, each subset of pixels including at least two pixels having a common one of a plurality of designated shade values in the range of shade values;
   program code means for determining, for each of a plurality of combinations of pixels taken from the pixels in the subsets of pixels, a geometric measure of the pixels in said combination;
   program code means for encoding the geometric measures into a digital code for the skin-covered body part.

40. An apparatus for obtaining a digital code representative of a skin-covered body part, the apparatus including:
   means for acquiring an image of the skin-covered body part, the image including a plurality of pixels, each pixel having an associated shade value in a range of shade values;
   means for identifying a plurality of subsets of pixels from the plurality of pixels, each subset of pixels including at least two pixels having a common one of a plurality of designated shade values in the range of shade values;
   means for determining, for each of a plurality of combinations of pixels taken from the pixels in the subsets of pixels, a geometric measure of the pixels in said combination;
   means for encoding the geometric measures into a digital code for the skin-covered body part.

* * * * *